United States Patent
Zhang

(10) Patent No.: US 10,348,474 B2
(45) Date of Patent: Jul. 9, 2019

(54) METHOD AND APPARATUS FOR PROCESSING CELL INTERFERENCE

(71) Applicant: ZTE CORPORATION, Shenzhen, Guangdong Province (CN)

(72) Inventor: Fang Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 135 days.

(21) Appl. No.: 15/514,672

(22) PCT Filed: Mar. 23, 2015

(86) PCT No.: PCT/CN2015/074912
§ 371 (c)(1),
(2) Date: Mar. 27, 2017

(87) PCT Pub. No.: WO2016/045330
PCT Pub. Date: Mar. 31, 2016

(65) Prior Publication Data
US 2017/0230164 A1 Aug. 10, 2017

(30) Foreign Application Priority Data
Sep. 26, 2014 (CN) .......................... 2014 1 0505854

(51) Int. Cl.
*H04L 5/00* (2006.01)
*H04W 24/02* (2009.01)
(Continued)

(52) U.S. Cl.
CPC .......... *H04L 5/0073* (2013.01); *H04L 5/0023* (2013.01); *H04L 5/0067* (2013.01);
(Continued)

(58) Field of Classification Search
CPC .... H04L 5/0023; H04L 5/0067; H04L 5/0073
See application file for complete search history.

(56) References Cited

U.S. PATENT DOCUMENTS

| | | | |
|---|---|---|---|
| 2014/0169239 A1 | 6/2014 | Maaref et al. | |
| 2015/0016434 A1* | 1/2015 | Luo ..................... | H04W 72/082 370/336 |

(Continued)

FOREIGN PATENT DOCUMENTS

| | | |
|---|---|---|
| CN | 101400135 | 4/2009 |
| CN | 103369539 | 10/2013 |

OTHER PUBLICATIONS

International Search Report, International application No. PCT/CN2015/074912, dated Jul. 1, 2015.

*Primary Examiner* — Kashif Siddiqui

(57) ABSTRACT

Provided is a method and apparatus for processing cell interference. The method includes: acquiring spatial beam interference information between each of nodes and a surrounding node of each node; determining an interference management strategy for a service in each node according to the spatial beam interference information and resource allocation information of the surrounding node of each node, wherein the resource allocation information is information for allocating resources of a service in the surrounding node of each node, and the resources are in a time domain, a frequency domain and a space domain; and executing the interference management strategy of the service in each node. The solution above solves the problem that interference management schemes in the related art can only be used independently to manage interference in a time domain, frequency domain or space domain.

11 Claims, 8 Drawing Sheets

(51) Int. Cl.
  *H04W 24/04* (2009.01)
  *H04W 24/08* (2009.01)
(52) U.S. Cl.
  CPC ........... *H04W 24/02* (2013.01); *H04W 24/04* (2013.01); *H04W 24/08* (2013.01)

(56) References Cited

U.S. PATENT DOCUMENTS

2017/0202025 A1* 7/2017 Ouchi ................... H04W 16/32
2018/0249453 A1* 8/2018 Nagaraja ........... H04W 36/0072

* cited by examiner

|     | TP2   | TP3   |
|-----|-------|-------|
| BI1 | {7}   | {}    |
| BI2 | {6,7} | {}    |
| BI3 | {5,6} | {7,8} |
| BI4 | {}    | {6,7} |
| BI5 | {}    | {6}   |
| BI6 | {}    | {}    |
| BI7 | {}    | {}    |
| BI8 | {}    | {}    |

METHOD AND APPARATUS FOR PROCESSING CELL INTERFERENCE

TECHNICAL FIELD

The disclosure relates to the field of communications, and in particular to a method and apparatus for processing cell interference.

BACKGROUND

As wireless communication technologies develop continuously, high-speed data services and demands for access to a network at any place increase explosively. It is predicted that the traffic will be increased by 1000 times by 2020, thus, the capacity of a Broadband radio access network should be increased to meet the further demands of services of users.

Aiming at demands for broadband wireless access, researches on the demand for and the key technology of the fifth-generation mobile communication system have been initiated in the European Union, China, Japan and the United States. The main approaches for increasing the throughput of a network include: increasing the transmission speed of a point-to-point link, extending a frequency spectrum resource and deploying heterogeneous networks in a high density, wherein heterogeneous networks deployed in a high density will support a traffic that is 20-30 times as much as the current traffic. In the environment of the heterogeneous networks deployed in the high density, the coverage area of a cell is decreased to increase the spatial multiplexing rate of a frequency spectrum resource, at the same time, interference becomes the primary challenge to the high-density deployment of networks. The heterogeneous networks deployed in a high density, in which interference distribution is relatively complicated and services types and the number of users are huge, need a flexible resource configuration scheme so as to adapt to the dynamic property of the networks.

Interference management schemes in the related art include schemes for coordinating and managing resources in different dimensions including a time domain, a frequency domain and a space domain, however, these interference management schemes each of which is used to manage resources in a dimension are independent, an integrated scheme for managing interference in a plurality of dimensions, especially in the directions of spatial beams, has not been taken into consideration.

No effective solutions have been proposed to address the problem that interference management schemes in the related art can only be used independently to manage interference in a time domain, frequency domain or space domain.

SUMMARY

The disclosure is mainly intended to provide a method and apparatus for processing cell interference to at least address the problem that interference management schemes in the related art can only be used independently to manage interference in a time domain, frequency domain or space domain.

To realize the foregoing purpose, in accordance with an embodiment of the disclosure, a method for processing cell interference is provided which includes: acquiring spatial beam interference information between each of nodes and a surrounding node of each node; determining an interference management strategy for a service in each node according to the spatial beam interference information and resource allocation information of the surrounding node of each node, wherein the resource allocation information is information for allocating resources of a service in the surrounding node of each node, and the resources are in a time domain, a frequency domain and a space domain; and executing the interference management strategy of the service in each node.

In an example embodiment, acquiring the spatial beam interference information between each of the nodes and the surrounding node of each node includes: determining a beam direction in which signal quality is optimal between each node and UE; and determining the spatial beam interference information between each node and the surrounding node of each node according to a Reference Signal Receiving Power (RSRP) value or a Reference Signal Receiving Quality (RSRQ) value of each node in a corresponding beam direction.

In an example embodiment, determining the spatial beam interference information between each node and the surrounding node of the each node according to the RSRP value or the RSRQ value of each node in the corresponding beam direction includes: determining, when the difference between RSRP values or RSRQ values of any two nodes of the nodes is smaller than a first preset threshold value and the RSRP values or RSRQ values of the two nodes in corresponding beam directions are both greater than a second preset threshold value, that there is an interference relationship between the two nodes in the corresponding beam directions; and acquiring the spatial beam interference information between each node and the surrounding node of each node according to the interference relationship.

In an example embodiment, after acquiring the spatial beam interference information between each of the nodes and the surrounding node of each node, the method further includes: establishing or updating a spatial beam interference table of each node according to the spatial beam interference information.

In an example embodiment, relationships between the nodes include a centralized architecture and a distributed architecture; each of the nodes comprises a control-panel node or a centralized manager; and establishing or updating a beam interference table of each node according to spatial beam interference information between the nodes includes: in the centralized architecture, receiving, by a centralized manager, spatial beam interference information from each control-panel node in a region, and establishing or updating, by the centralized manager, an interference relationship table of each control-panel node in the region; and in the distributed architecture, receiving, by each control-panel node, spatial beam interference information from a surrounding node of each control-panel node, and establishing or updating, by each control-panel node, an interference relationship table corresponding to each control-panel node.

In an example embodiment, determining the interference management strategy for the service in each node according to the resource allocation information of the surrounding node of each node and the beam interference table of each node includes: in the centralized architecture, determining, by the centralized manager, the interference management strategy for all services in the region in an order of priorities of the services, according to resource allocation conditions of the surrounding node of the centralized manager in the time domain, the frequency domain and the space domain, in combination with the interference relationship table; and in the distributed architecture, acquiring, by a control-panel node, resource allocation conditions of a surrounding node of the control-panel node in the time domain, the frequency domain and the space domain according to spatial beam interference of the surrounding node of the control-panel node, and determining, by the control-panel node, the interference management strategy according to the obtained resource allocation conditions in combination with the interference relationship table.

In an example embodiment, the interference management strategy includes at least one of the following: joint transmission, resource evasion, interference elimination and interference alignment.

In an example embodiment, determining the interference management strategy for the service in each node according to the resource allocation information of the surrounding node of each node and the beam interference table of each node includes: determining a space-domain beam range of the interference management strategy according to a movement velocity of user equipment; determining, in the space-domain beam range, an interfering node, excluding a cooperative node and a serving node, and a beam direction corresponding to the interfering node from the beam interference table, obtaining the resource allocation information of the interfering node in the corresponding beam direction and disabling a time-frequency resource and a space-domain resource, which are pre-allocated to the interfering node; determining whether or not there is a common usable time-frequency resource and a common usable space-domain resource between the serving node and the cooperative node in a corresponding beam direction, when there is the common usable time-frequency resource and the common usable space-domain resource, conducting a cooperative sending operation in the joint transmission manner, when there is no the common usable time-frequency resource or common usable space-domain resource, determining whether or not a time-frequency resource and a space-domain resource of the serving node and the cooperative node are able to be evaded in a corresponding beam direction, when the time-frequency resource and the space-domain resource of the serving node and the cooperative node are able to be evaded in a corresponding beam direction, adopting a strategy of the resource evasion, when the time-frequency resource and the space-domain resource of the serving node and the cooperative node are not able to be evaded in a corresponding beam direction, adopting a strategy of the inference alignment or interference elimination; and determining a time-frequency resource and a space-domain resource that are pre-allocated to the serving node and the cooperative node according to the interference management strategy.

In an example embodiment, the space-domain beam range of the interference management strategy is determined according to the following formula:

$$S=[BI_t-\lfloor V^*\alpha \rfloor, BI_t+\lfloor V^*\beta \rfloor],$$

in which $\alpha$ and $\beta$ are weighting factors, the symbol $\lfloor \ \rfloor$ represents a rounding operation, V represents the movement velocity of the UE, and $BI_t$ represents an optimal beam direction of a serving node obtained according to a reference signal or a training signal.

In an example embodiment, the serving node and the cooperative node are determined in one of the following ways: in the centralized architecture, determining, by the centralized manager, a serving node and a cooperative node of a specified service according to the beam interference table of each control-panel node in combination with a load of each control-panel node; and in the distributed architecture, receiving, by the control-panel node, spatial beam interference information from a surrounding node of the control-panel node, and determining, by the control-panel node, a serving node and a cooperative node of a specified service according to the received beam interference information in combination with a load of the control-panel node.

In an example embodiment, determining the serving node and the cooperative node corresponding to the specified service includes: selecting, according to an RSRP value or RSRQ value of each node in an optimal beam direction, a node of which an RSRP value or RSRQ value is optimal as a candidate serving node, and determining a beam direction corresponding to the candidate serving node; and in the centralized architecture, determining, by the centralized manager, a serving node and a cooperative node meeting a requirement of Quality of Service (QoS) of a specified service according to information of the candidate serving node in combination with the load of each control-panel node and information of a backhaul network; or in the distributed architecture, determining, by the control-panel node, a serving node and a cooperative node meeting a requirement of QoS of a specified service according to information of the candidate serving node in combination with a load of a surrounding node of the control-panel node and the information of a backhaul network.

In accordance with another embodiment of the disclosure, an apparatus for processing cell interference is provided which includes: an acquisition component, configured to acquire spatial beam interference information between each node of nodes and a surrounding node of each node; a determination component, configured to determine an interference management strategy for a service in each node according to spatial beam interference information in a spatial beam interference table and resource allocation information of the surrounding node of each node, wherein the resource allocation information is information for allocating resources of a service in the surrounding node of each node, and the resources are in a time domain, a frequency domain and a space domain; and an execution component, configured to execute the interference management strategy of the service in each node.

According to embodiments of the disclosure, spatial beam interference information between each of nodes and a surrounding node of each node is acquired; an interference management strategy for a service in each node is determined according to the spatial beam interference information and resource allocation information of the surrounding node of each node, wherein the resource allocation information is information for allocating resources of a service in the surrounding node of each node, and the resources are in a time domain, a frequency domain and a space domain; and the interference management strategy of the service in each node is executed; the problem that interference management schemes in the related art can only be used independently to manage interference in a time domain, frequency domain or space domain is solved, thereby adapting the diversity and the dynamics of interference more flexibly.

BRIEF DESCRIPTION OF THE DRAWINGS

The drawings described herein are intended to provide further understanding of the disclosure, and form a part of the disclosure. The schematic embodiments and descriptions of the disclosure are intended to explain the disclosure, and do not form improper limits to the disclosure. In the drawings.

DETAILED DESCRIPTION OF THE EMBODIMENTS

The disclosure is described below with reference to the drawings and the embodiments in detail. It is noted that the embodiments of the disclosure and the features of the embodiments can be combined with each other if there is no conflict.

The steps shown in accompanying flowcharts may be executed in a computer system with a set of computer-executable instructions, moreover, although certain logic sequences are shown in the flowcharts, the steps shown or described may be executed in sequences different from those shown herein in some cases.

Figure 1:
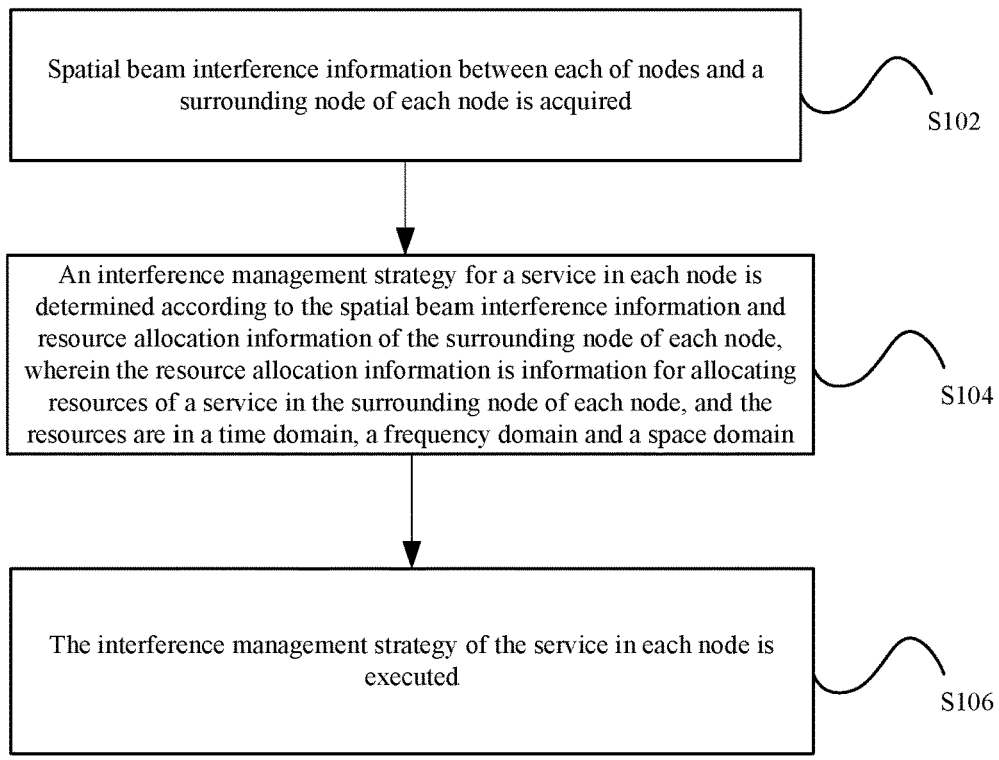
FIG. 1 is a flowchart showing a method for processing cell interference according to an embodiment of the disclosure.

A method for processing cell interference is provided in an embodiment; FIG. 1 is a flowchart showing a method for processing cell interference according to an embodiment of the disclosure; and as shown in FIG. 1, the method includes the following steps.

At Step S102, spatial beam interference information between each of nodes and a surrounding node of each node is acquired;

at Step S104, an interference management strategy for a service in each node is determined according to the spatial beam interference information and resource allocation information of the surrounding node of each node, wherein the resource allocation information is information for allocating resources of a service in the surrounding node of each node, and the resources are in a time domain, a frequency domain and a space domain; and at Step S106, the interference management strategy of the service in each node is executed.

According to the steps above, spatial beam interference information between each of nodes and a surrounding node of each node is acquired; an interference management strategy for a service in each node is determined according to the spatial beam interference information and resource allocation information of the surrounding node of each node, wherein the resource allocation information is information for allocating resources of a service in the surrounding node of each node, and the resources are in a time domain, a frequency domain and a space domain; and the interference management strategy of the service in each node is executed; the problem that interference management schemes in the related art can only be used independently to manage interference in a time domain, frequency domain or space domain is solved, thereby adapting the diversity and the dynamics of interference more flexibly.

In an example embodiment, the Step S102 may be executed in the following way that a beam direction, in which signal quality is optimal between each node and UE, is determined; and the spatial beam interference information between each node and the surrounding node of each node is determined according to a RSRP value or a RSRQ value of each node in a corresponding beam direction.

In an example embodiment, determining the spatial beam interference information between each node and the surrounding node of each node according to the RSRP value or the RSRQ value of the node in the corresponding beam direction includes that it is determined, when the difference between RSRP values or RSRQ values of any two nodes of the nodes is smaller than a first preset threshold value and the RSRP values or RSRQ values of the two nodes in corresponding beam directions are both greater than a second preset threshold value, that there is an interference relationship between the two nodes in the corresponding beam directions; and the spatial beam interference information between each node and the surrounding node of each node is acquired according to the interference relationship.

In an example embodiment, the method may further include, after S102, a step of establishing or updating a spatial beam interference table of each node according to the spatial beam interference information.

In an example embodiment, relationships between the nodes includes a centralized architecture and a distributed architecture; each of the nodes includes a control-panel node or a centralized manager; and S104 includes steps that: in the centralized architecture, a centralized manager receives spatial beam interference information from each control-panel node in a region, and establishes or updates an interference relationship table of each control-panel node in the region; and in the distributed architecture, each control-panel node receives spatial beam interference information from a surrounding node of each control-panel node, and establishes or updates an interference relationship table corresponding to each control-panel node. The centralized structure refers to that a plurality of nodes are connected with a centralized manager via a wired or wireless backhaul network; and the distributed structure refers to that each node transfers information mutually through a wireless interface, for example, through an X2 interface.

In an embodiment, Step 104 may also be executed in the following way that in the centralized architecture, the centralized manager determines the interference management strategy for all services in the region in an order of priorities of the services, according to resource allocation conditions of the surrounding node of the centralized manager in the time domain, the frequency domain and the space domain, in combination with the interference relationship table; and in the distributed architecture, a control-panel node acquires resource allocation conditions of a surrounding node of the control-panel node in the time domain, the frequency domain and the space domain according to spatial beam interference of the surrounding node of the control-panel node, and the control-panel node determines the interference management strategy according to the obtained resource allocation conditions in combination with the interference relationship table.

In an example embodiment, the interference management strategy includes at least one of the following: joint transmission, resource evasion, interference elimination and interference alignment.

In an example embodiment, the step of determining the interference management strategy for the service in each node according to the resource allocation information of the surrounding node of each node and the beam interference table of each node includes that: a space-domain beam range of the interference management strategy is determined according to a movement velocity of user equipment; in the space-domain beam range, an interfering node, excluding a cooperative node and a serving node, and a beam direction corresponding to the interfering node are determined from the beam interference table; the resource allocation information of the interfering node in the corresponding beam direction is obtained; and a time-frequency resource and a space-domain resource, which are pre-allocated to the interfering node, are disabled; it is determined whether or not there is a common usable time-frequency resource and a common usable space-domain resource between the serving node and the cooperative node in a corresponding beam direction; when there is the common usable time-frequency resource and the common usable space-domain resource, a cooperative sending operation is conducted in the joint transmission manner; when there is no the common usable time-frequency resource or common usable space-domain resource, it is determined whether or not a time-frequency resource and a space-domain resource of the serving node and the cooperative node are able to be evaded in a corresponding beam direction; when the time-frequency resource and the space-domain resource of the serving node and the cooperative node are able to be evaded in a corresponding beam direction, a strategy of the resource evasion is adopted; when the time-frequency resource and the space-domain resource of the serving node and the cooperative node are not able to be evaded in a corresponding beam direction, a strategy of the inference alignment or interference elimination is adopted; and a time-frequency resource and a space-domain resource that are pre-allocated to the serving node and the cooperative node are determined according to the interference management strategy.

In an example embodiment, the space-domain beam range of the interference management strategy is determined according to the following formula:

$$S = [BI_i - \lfloor V^*\alpha \rfloor, BI_i + \lfloor V^*\beta \rfloor],$$

in which $\alpha$ and $\beta$ are weighting factors, the symbol $\lfloor \ \rfloor$ represents a rounding operation, V represents the movement velocity of the UE, and $BI_i$ represents an optimal beam direction of a serving node obtained according to a reference signal or a training signal.

In an example embodiment, the serving node and the cooperative node are determined in one of the following ways: in the centralized architecture, the centralized manager determines a serving node and a cooperative node of a specified service according to the beam interference table of each control-panel node in combination with a load of each control-panel node; and in the distributed architecture, the control-panel node receives spatial beam interference information from a surrounding node of the control-panel node, and the control-panel node determines a serving node and a cooperative node of a specified service according to the received beam interference information in combination with a load of the control-panel node.

In an example embodiment, the step of determining the serving node and the cooperative nodes of a specified service includes that: according to an RSRP value or RSRQ value of each node in an optimal beam direction, a node of which an RSRP value or RSRQ value is optimal is selected as a candidate serving node, and a beam direction corresponding to the candidate serving node is determined; and in the centralized architecture, the centralized manager determines a serving node and a cooperative node meeting a requirement of QoS of a specified service according to information of the candidate serving node in combination with the load of each control-panel node and information of a backhaul network; or in the distributed architecture, the control-panel node determines a serving node and a cooperative node meeting a requirement of QoS of a specified service according to information of the candidate serving node in combination with a load of a surrounding node of the control-panel node and the information of a backhaul network.

Figure 2:
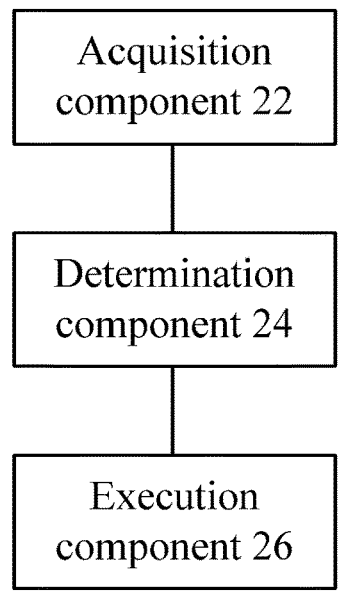
FIG. 2 is a structure diagram showing an apparatus for processing cell interference according to an embodiment of the disclosure.

An apparatus for processing cell interference is also provided in the embodiment, FIG. 2 is a structure diagram showing an apparatus for processing cell interference according to an embodiment of the disclosure, and as shown in FIG. 2, the apparatus may include: an acquisition component 22, configured to acquire spatial beam interference information between each node of nodes and a surrounding node of each node; a determination component 24, configured to determine an interference management strategy for a service in each node according to spatial beam interference information in a spatial beam interference table and resource allocation information of the surrounding node of each node, wherein the resource allocation information is information for allocating resources of a service in the surrounding node of each node, and the resources are in a time domain, a frequency domain and a space domain; and an execution component 26, configured to execute the interference management strategy of the service in each node.

The components and the elements involved in embodiments of the disclosure can be implemented as software or hardware. The components and the units described herein may be configured in a processor, for example, it may be described like this: a processor includes the acquisition component 22 and the determination component 24, wherein the names of the components are not to be construed as a limitation to the components, in some cases, for example, the acquisition component may also be described as a component configured to acquire the spatial beam interference between each of nodes and a surrounding node of the each node.

The apparatus provided for realizing the above mentioned method for processing interference is not described herein repeatedly, because the realization of the functions thereof has been described in the above embodiments.

The method and the apparatus provided herein are exemplified below with reference to example embodiments.

In an example embodiment of the disclosure, an interference management method is provided which integrates the interference management in a plurality of dimensions including a time domain, a frequency domain and a spatial beam direction, wherein the method implements abstract modeling on the interference in a direction of a spatial beam and selects a proper interference management scheme in different interference scenes, thereby adapting the diversity and the dynamics of interference more flexibly.

In an example embodiment of the disclosure, an interference management apparatus for a virtual cell is provided, which includes:

a measurement component located at the side of a User Equipment (UE) or a Small Cell node, configured to measure and report a Reference Signal (RS);

a beam interference table located at the side of the Small Cell node, wherein interference charts reflecting the interference in beam directions of different nodes are established according to a measurement result obtained from a UE side or a Transmission Point (TP) sides;

an interference relationship database in a centralized manager, wherein a multi-dimensional interference relationship database reflecting the interference among nodes in a time domain, a frequency domain and a space domain is established according to the beam interference table of each node;

an interference management strategy component located in the centralized manager (centralized architecture) or at the side of the Small Cell node (distributed architecture), configured to determine a corresponding interference management scheme according to different interference scenes, wherein the interference management scheme includes interference coordination, interference evasion, interference elimination or interference alignment, etc, and send corresponding interference management strategy information, for example, resources available in the time domain, resources available in the frequency domain and signal processing information, to a corresponding node; and an interference management processing component located at the side of a node, configured to perform a corresponding operation, for example, a resource allocation operation or a signal processing operation, according to the interference management strategy information received from the interference management strategy component.

A measurement result measured by the measurement component at the side of the UE is sent to a Small Cell node via an air interface, and the Small Cell node establishes a beam interference table according to the measurement result sent from the side of the UE or a measurement result sent from the side of a TP and synchronously determines an interference management scheme according to a corresponding interference scene and then sends the strategy information of the interference management strategy to a corresponding node through a backhaul network (centralized) or an X2 interface (distributed);

A cell interference management method for a virtual cell provided in an example embodiment of the disclosure includes the following steps.

At Step A, a control-panel node receives a measurement result of a reference signal of a UE measured by a surrounding node of the control-panel node, determines a candidate serving node and synchronously updates a beam interference relationship table;

optionally, the control-panel node receives a measurement result of a reference signal of a surrounding node measured by a UE, determines a candidate serving node and synchronously updates a beam interference relationship table.

Specifically, first, a beam emission direction in a space domain is quantified, different beam directions are represented with different indexes, and a beam direction in which signal quality is optimal between each control-panel node and the UE is determined according to a reference signal or a training signal.

Secondly, a candidate serving node and a corresponding beam direction of the candidate serving node are determined according to the RSRP or RSRQ of each control-panel node in the optimal beam direction; and optionally, the node having the optimal RSRP or RSRQ is selected as a candidate serving node.

Lastly, a RSRP value or RSRQ value of each control-panel node in a corresponding beam direction is compared to determine a mutual interference relationship between each control-panel node, and the beam interference relationship table is updated; optionally, RSRP values or RRSRQ values of two control-panel nodes in a corresponding beam direction are compared, when the difference is smaller than a certain threshold value and the RSRP values or RSRQ values of the two control-panel nodes in the corresponding beam direction are both greater than a second preset threshold value, then there is an interference relationship between the two control-panel nodes in the corresponding beam direction; and information of the two control-panel nodes and index information of the corresponding beam direction are updated in a beam interference table.

At Step B, a centralized manager receives spatial beam interference information from a control-panel node and updates the interference information database of each control-panel node in a region.

Optionally, in the distributed architecture, a control-panel node receives spatial beam interference information from a surrounding node of the control-panel node and updates a beam interference table corresponding to the control-panel node.

At Step C, the centralized manager determines a serving node for a corresponding service and a corresponding interference management strategy according to the candidate serving node information and the spatial beam interference information received from the control-panel node in combination with a load of each control-panel node, information of a backhaul network and the like, wherein the interference management strategy includes: joint transmission, resource evasion, interference elimination or interference alignment.

Optionally, in the distributed architecture, a control-panel node receives load information of a surrounding node of the control-panel node, information of a backhaul network and interference management strategy information and determines a serving node of a corresponding service and a corresponding interference management strategy, wherein the interference management strategy includes: joint transmission, resource evasion, interference elimination or interference alignment.

Specifically, first, the centralized manager determines, according to a load of each control-panel node and information of a backhaul network, a corresponding serving node and a cooperative node for all services in a region in the order of priorities of the services.

Optionally, in the distributed architecture, the control-panel node determines a serving node and a cooperative node of a corresponding service according to a load of a surrounding node of the control-panel node and information of a backhaul network;

Secondly, the centralized manager determines, according to a resource allocation condition of a surrounding node of the centralized manager in the time domain, the frequency domain or the space domain in combination with a interference relationship database, an interference management strategy for all services in a region in the order of priorities of the services.

Optionally, in the distributed architecture, the control-panel node obtains a resource allocation condition of a surrounding node of the control-panel node in the time domain, the frequency domain or the space domain according to interference management strategy information of the surrounding node of the control-panel node and determines an interference management strategy according to the resource allocation condition in combination with a beam interference table.

Specifically, first, a space-domain beam range of the interference management strategy is determined according to a movement velocity of UE; when it is assumed that the movement velocity of the UE is V and the index of optimal beam direction of the serving node obtained according to a reference signal or training signal is $BI_i$, then the space-domain beam range that needs to be taken into consideration in the interference management strategy is $[BI_i-\lfloor V^*\alpha \rfloor, BI_i+\lfloor V^*\beta \rfloor]$, in which $\alpha$ and $\beta$ are weighting factors, and the symbol $\lfloor \ \rfloor$ represents a rounding operation.

Secondly, the number of cooperative nodes is compared with that of interfering nodes, when the number of the cooperative nodes is smaller than that of the interfering nodes, then interfering nodes besides the cooperative nodes and corresponding beam directions are found from a beam interference table. A interference management strategy of the interfering nodes in the beam directions is obtained, for example, pre-allocation information of resources in the time domain, the frequency domain and the space domain. The resources pre-allocated to the interfering nodes in the time domain, the frequency domain and the space domain are set to be disabled.

Lastly, it is determined whether or not there is a common usable resource between the cooperative nodes in a corresponding beam direction, when there is a common usable resource, a cooperative sending operation is performed in a joint transmission manner, otherwise, a resource evasion or interference elimination manner is adopted, and resources in a time domain, a frequency domain and a space domain that are pre-allocated to the serving node and the cooperative nodes are determined.

At Step D, the centralized manager or equipment in a upper layer of the control-panel node distributes the interference management strategy information, for example, an interference management scheme, resource pre-allocation information or signal processing information, and the like, to a control-panel node, and the control-panel node executes the interference management strategy and determines, based on the interference strategy information, a corresponding resource assignment scheme or a signal processing scheme for each service according to channel status information.

According to example embodiments of the disclosure, the modeling is performed for the interference relationship of a space-domain beam direction, models for a plurality of dimensions including a time domain, a frequency domain and a space domain are integrated in interference management, and a proper interference management strategy is selected for different scenes, thereby realizing that the diversity and the dynamics of interference is adapted better; resources in a space-domain are utilized effectively; the resource utilization rate of a system is increased; inter-cell interference is suppressed effectively; the frequency spectrum efficiency of a network is enhanced.

Figure 3:
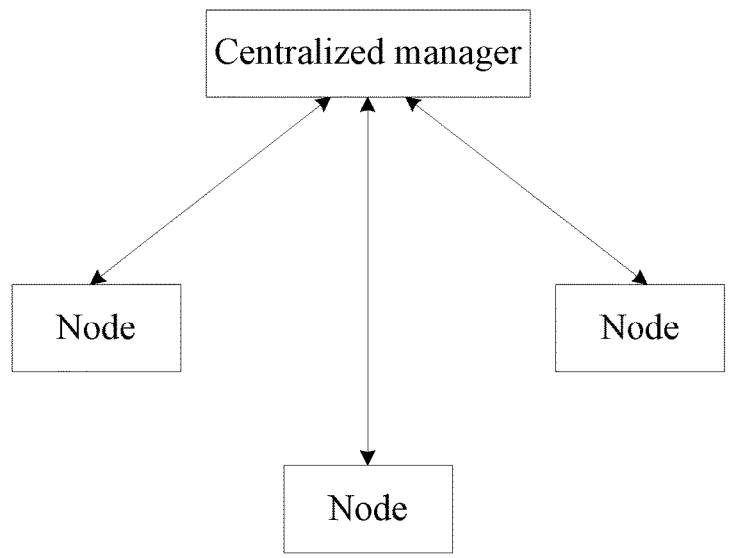
FIG. 3 is a schematic diagram showing a centralized architecture of cell nodes according to an example embodiment of disclosure.

FIG. 3 is a schematic diagram showing a centralized architecture of cell nodes according to an example embodiment of disclosure, as shown in FIG. 3, a plurality of Small Cell nodes are connected with a centralized manager through a wired or wireless backhaul network, wherein the centralized manager, wherein the centralized manager may be a macro station, a domain server or a functionally powerful Small Cell node, and is in charge of managing the interference in a region, wireless resources, data routing and so on.

Figure 4:
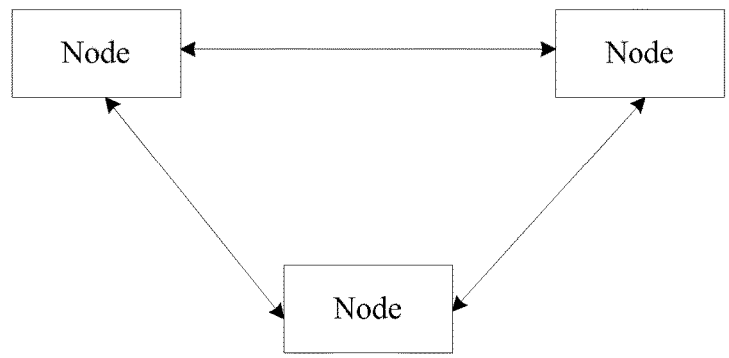
FIG. 4 is a schematic diagram showing a distributed architecture of cell nodes according to an example embodiment of disclosure.

FIG. 4 is a schematic diagram showing a distributed architecture of cell nodes according to an example embodiment of disclosure, as shown in FIG. 4, each Small Cell node transfers information through an X2 interface, and each Small Cell node is independent from each other.

Figure 5:
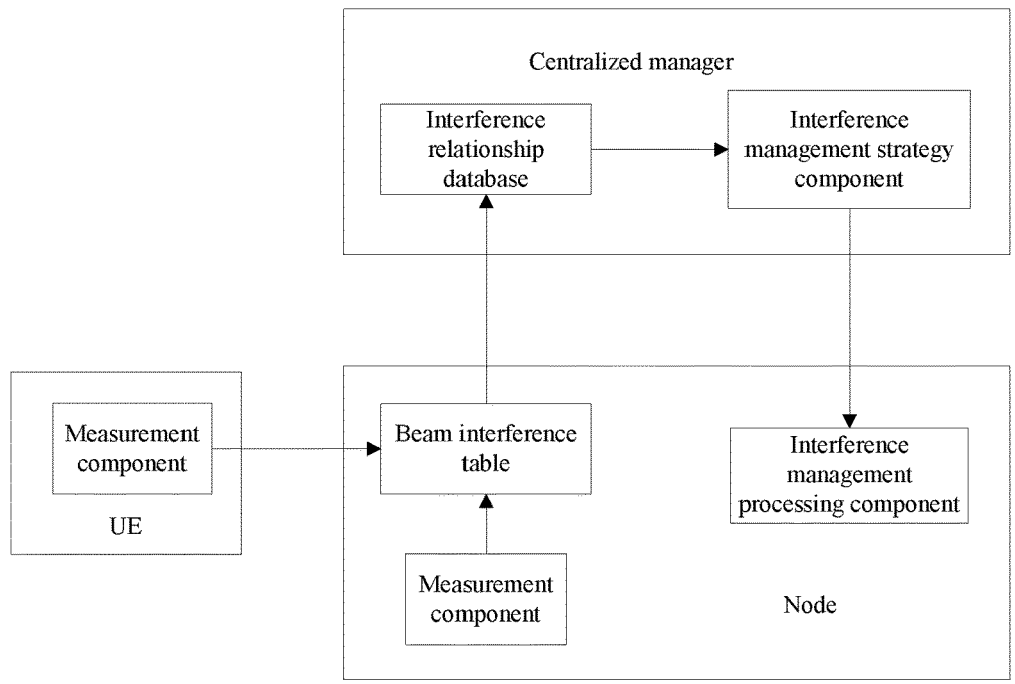
FIG. 5 is a structure diagram showing an apparatus for processing cell interference in a centralized architecture of cell nodes according to an example embodiment of the disclosure.
Figure 6:
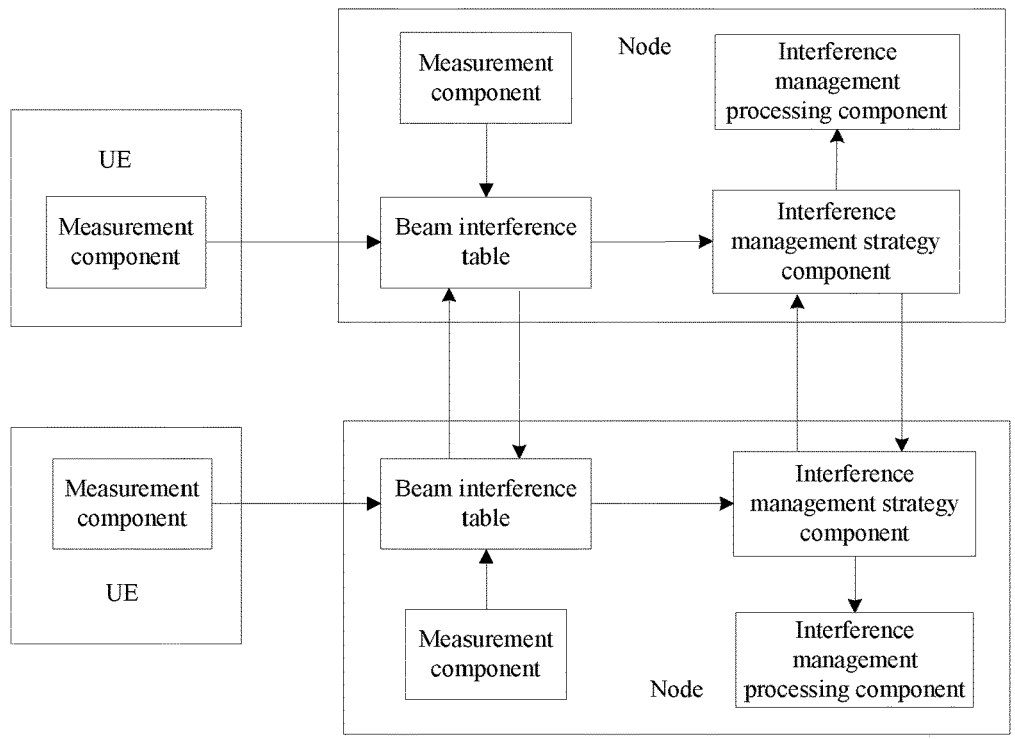
FIG. 6 is a structure diagram showing an apparatus for processing cell interference in a distributed architecture of cell nodes according to an example embodiment of the disclosure.
Figure 7:
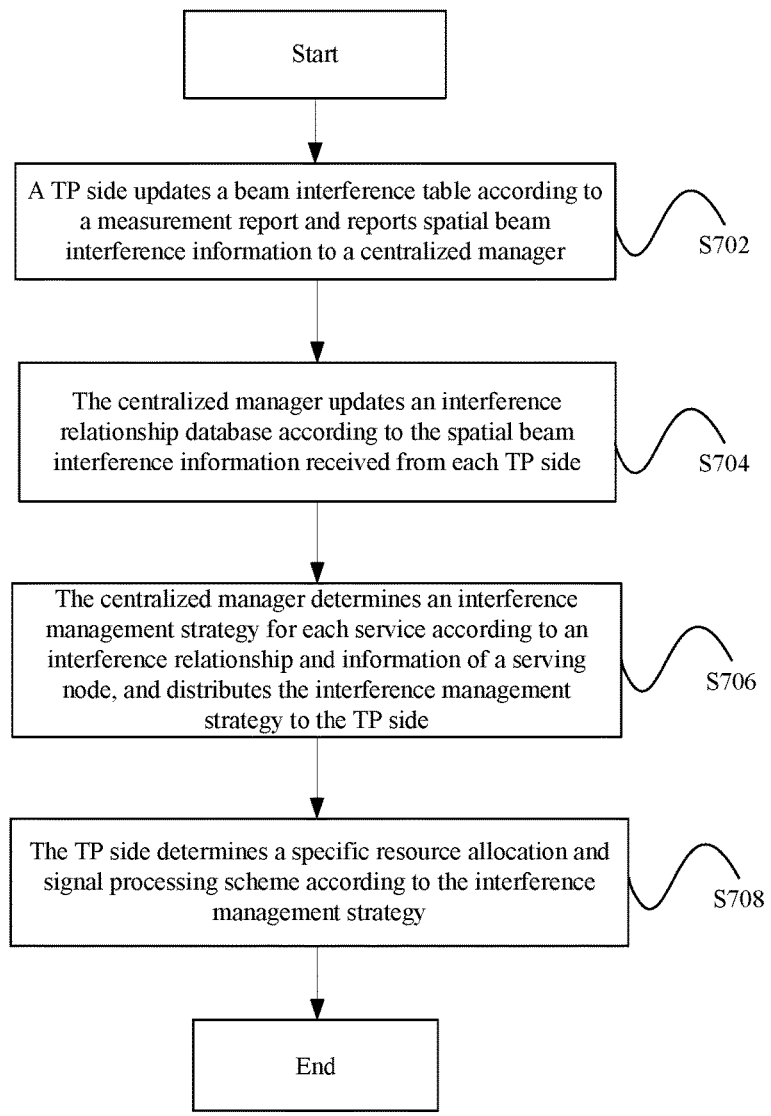
FIG. 7 is a flowchart showing a method for processing cell interference in a centralized architecture of cell nodes according to an example embodiment of the disclosure.
Figure 8:
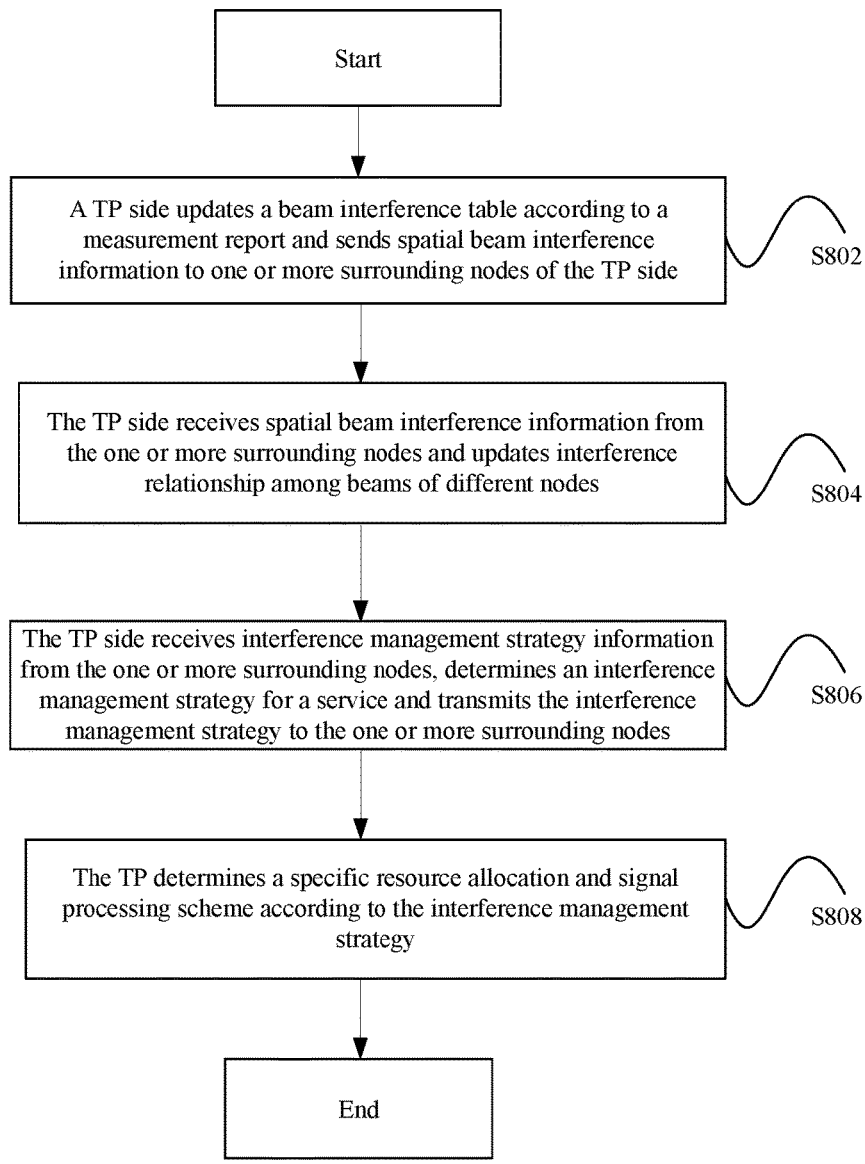
FIG. 8 is a flowchart showing a method for processing cell interference in a distributed architecture of cell nodes according to an example embodiment of the disclosure.

FIG. 5 is a structure diagram showing an apparatus for processing cell interference in a centralized architecture of cell nodes according to an example embodiment of the disclosure, FIG. 6 is a structure diagram showing an apparatus for processing cell interference in a distributed architecture of cell nodes according to an example embodiment of the disclosure, FIG. 7 and FIG. 8 may be referred as flowcharts of interference management methods corresponding to the apparatuses shown in FIG. 5 and FIG. 6 that are used under a centralized architecture and a distributed architecture, FIG. 7 is a flowchart showing a method for processing cell interference in a centralized architecture of cell nodes according to an example embodiment of the disclosure, and as shown in FIG. 7, the steps shown in the flowchart of the method include:

S702: a TP side updates a beam interference table according to a measurement report and reports spatial beam interference information to a centralized manager;

S704: the centralized manager updates an interference relationship database according to the spatial beam interference information received from each TP side;

S706: the centralized manager determines an interference management strategy for each service according to an interference relationship and information of a serving node, and distributes the interference management strategy to the TP side; and S708: the TP side determines a specific resource allocation and signal processing scheme according to the interference management strategy.

FIG. 8 is a flowchart showing a method for processing cell interference in a distributed architecture of cell nodes according to an example embodiment of the disclosure, and the method shown in FIG. 8 includes the following steps:

S802: a TP side updates a beam interference table according to a measurement report and sends spatial beam interference information to one or more surrounding nodes of the TP side;

S804: the TP side receives spatial beam interference information from the one or more surrounding nodes and updates interference relationship among beams of different nodes;

S806: the TP side receives interference management strategy information from the one or more surrounding nodes, determines an interference management strategy for a service and transmits the interference management strategy to the one or more surrounding nodes; and S808: the TP determines a specific resource allocation and signal processing scheme according to the interference management strategy.

The steps of the methods shown in FIG. 7 and FIG. 8 are explained in detail through the following steps:

Step 1: each Small Cell node quantifies different beam emitting or receiving directions by representing different beam emitting or receiving directions with different indexes, wherein the indexes of spatially adjacent beam directions are adjacent.

Figure 9:
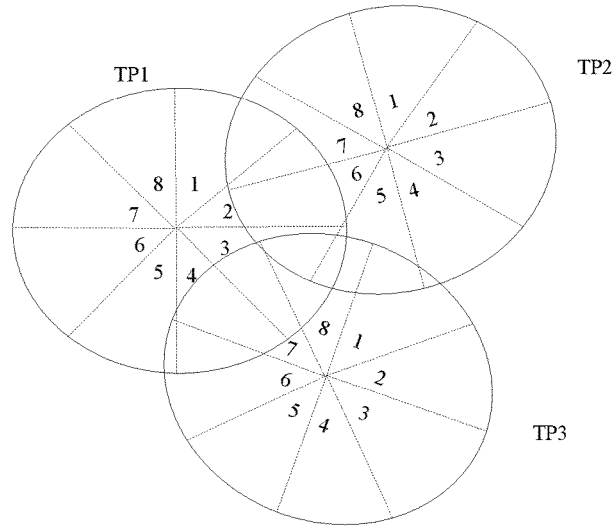
FIG. 9 is a schematic diagram showing a beam interference table for a certain node according to an example embodiment of the disclosure.

Step 2: each Small Cell node measures a RSRP value or RSRQ value of a reference signal of UE and compares RSRP values or RSRQ values of a reference signal in different beam directions to obtain an optimal beam direction; it should be noted that beam receiving directions should the same as beam emitting directions, and it is also possible to obtain the optimal beam direction via the UE measuring a training signal from a Small Cell node;

Step 3: RSRP values or RSRQ values of all Small Cell nodes in the optimal beam direction Index are compared to select a node of which quality is optimal as a candidate serving node; the difference between RSRP values or RSRQ values of each surrounding node and the candidate serving node is determined. When the absolute value of the difference is smaller than a certain threshold, there is interference between the surrounding node and the candidate serving node in a corresponding beam direction, and the beam interference table of the candidate serving node is updated with the interference information. FIG. 9 is a schematic diagram showing a beam interference table for a certain node according to an example embodiment of the disclosure, as shown in FIG. 9, the left table is a beam interference table of a node TP1 in which the columns of a matrix represent node number (No.) and the rows represent beam index (Index), respectively, the first row represents the existence of interference between the BI1 (Beam Index 1, beam direction indicator 1) of a node TP1 and the BI7 of a node TP2, and the second row represents the existence of interference between the BI2 of the node TP1 and the BI6 and the BI7 of the node TP2, and so on;

Step 4: in the centralized architecture, a Small Cell node reports the spatial beam interference information to the centralized manager, and the centralized manager centrally selects a cooperative node and an interference management strategy. After receiving the spatial beam interference information from Small Cell nodes in a region, the centralized manager establishes or updates existing interference relationship database in which the interference relationship among the spatial beam directions of different node is included. The centralized manager determines, according to a load of a node and information of a backhaul network, a serving node and a cooperative node for a service in a region in the order of priorities, and synchronously determines an interference management strategy according to the interference relationship database and usable resources of the cooperative node and interfering nodes in the time domain, the frequency domain and the space domain. Refer to FIG. 8 and FIG. 9, the specific flow of the interference management strategy specifically includes the following steps that:

First, the service of which priority is highest is selected, a serving node and the number L of cooperative nodes are determined according to QoS required by a service, and the L nodes that have smallest load and most backhaul resources are selected from interfering nodes as cooperative nodes.

Figure 10:
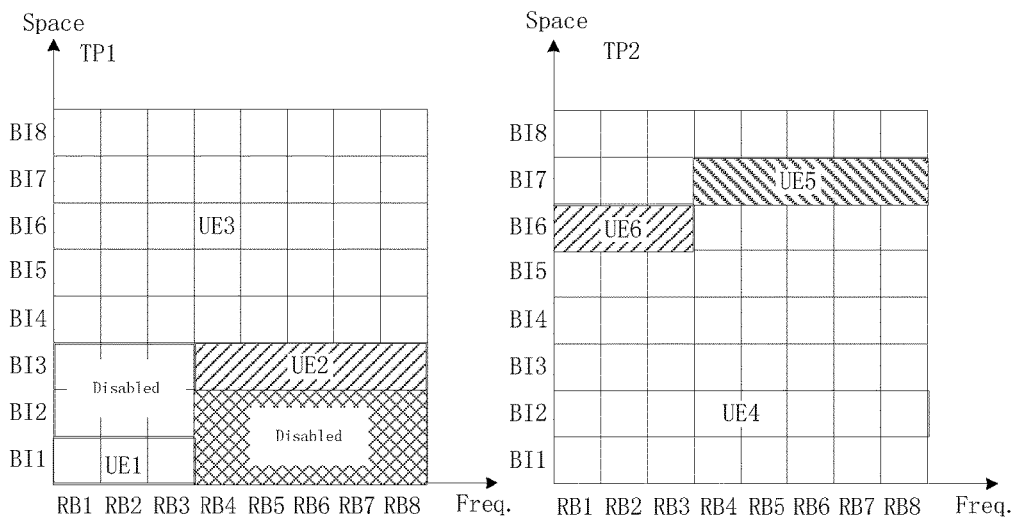
FIG. 10 is a schematic diagram showing interference evasion for the fusion of a frequency domain and a space domain according to an example embodiment of the disclosure.

Secondly, a space-domain beam range of an interference management strategy is determined according to a movement velocity of UE; when it is assumed that the movement velocity of the UE is V and the index of the optimal beam direction of a serving node obtained according to a reference signal or training signal is $BI_t$, then the space-domain beam range that needs to be taken into consideration in the interference management strategy is $[BI_t - \lfloor V*\alpha \rfloor, BI_t + \lfloor V*\beta \rfloor]$, in which $\alpha$ and $\beta$ are weighting factors, the symbol $\lfloor\ \rfloor$ represents a rounding operation;

the number of cooperative nodes is compared with that of interfering nodes, when the number of the cooperative nodes is smaller than that of the interfering nodes, then interfering nodes besides the cooperative nodes and corresponding beam directions are found from a beam interference table. A interference management strategy of the interfering nodes in the beam directions is obtained, for example, pre-allocation information of resources in the time domain, the frequency domain and the space domain. The resources pre-allocated to the interfering nodes in the time domain, the frequency domain and the space domain are set to be disabled. FIG. 10 is a schematic diagram showing interference evasion for the fusion of a frequency domain and a space domain according to an example embodiment of the disclosure, as shown in FIG. 10, it is assumed that a TP1 adopts beam directions BI1, BI3 and BI6 to provide services for UE1, UE2 and UE3, the resources pre-allocated to an interfering node TP2 of the TP1 are shown in the right table shown in FIG. 10; when resources are assigned to a user served by the TP1, beams having an interference relationship with a corresponding beam of the TP2, for example, the BI6 and the BI7 of the TP2 have an interference relationship with the BI1, the BI2 and the BI3 of the TP1, are found, and frequency-domain resources corresponding to the BI1, the BI2 and the BI3 of the TP1 are set to be disable.

Lastly, it is determined whether or not there is a common usable resource between the cooperative nodes in a corresponding beam direction, when there is a common usable resource, a cooperative sending operation is performed in a joint transmission manner, otherwise, it is determined whether or not the frequency-domain resources, in the beam directions which have an interference relationship with each other, can be evaded, if the frequency-domain resources can be evaded, interference is reduced in a resource evasion manner, otherwise, a signal processing method of aligning interference or eliminating interference is adopted.

Figure 11:
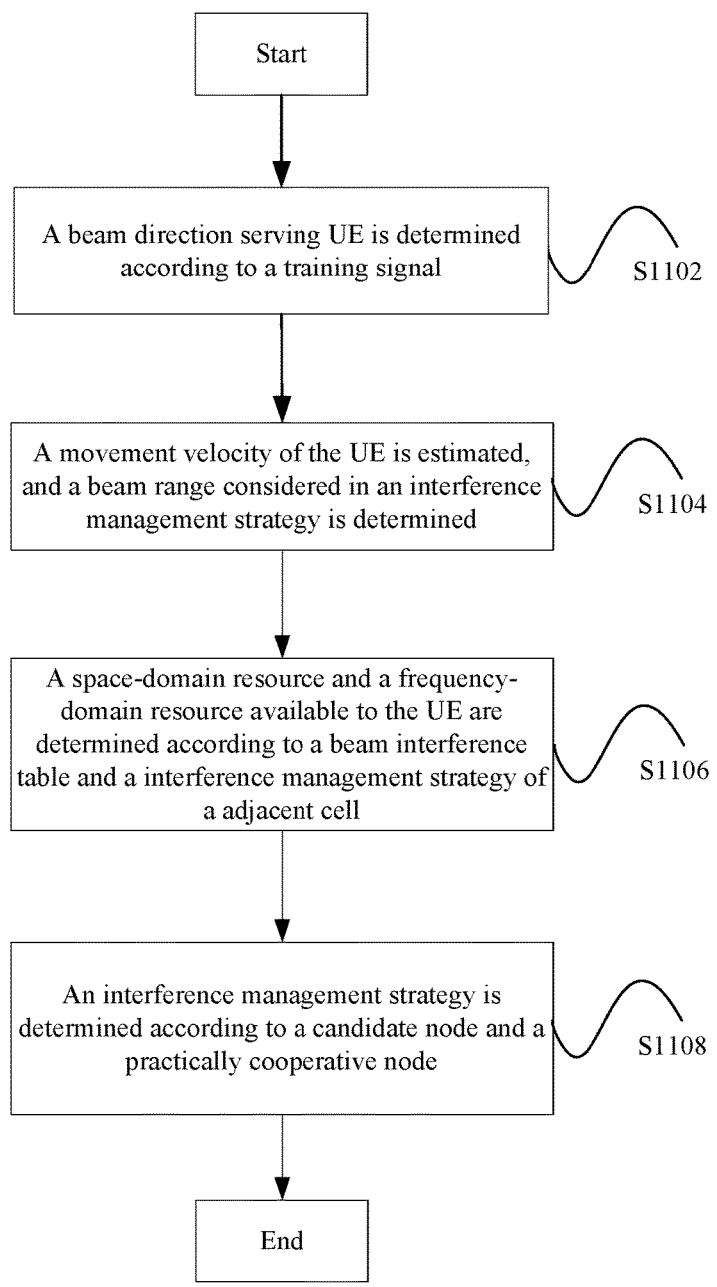
FIG. 11 is a flowchart showing steps for determining an interference management strategy in combination with a beam interference table according to an example embodiment of disclosure.

In the distributed architecture, the control-panel node obtains a resource allocation condition of a surrounding node of the control-panel node in the time domain, the frequency domain or the space domain according to interference management strategies of the surrounding nodes and determines an interference management strategy according to the resource allocation condition in combination with a beam interference table. FIG. 11 is a flowchart showing steps for determining an interference management strategy in combination with a beam interference table according to an example embodiment of disclosure, and as shown in FIG. 11, the flow includes the following steps:

S1102: a beam direction serving UE is determined according to a training signal;

S1104: a movement velocity of the UE is estimated, and a beam range considered in an interference management strategy is determined;

S1106: a space-domain resource and a frequency-domain resource available to the UE are determined according to a beam interference table and a interference management strategy of a adjacent cell; and S1108: an interference management strategy is determined according to a candidate node and a practically cooperative node.

Figure 12:
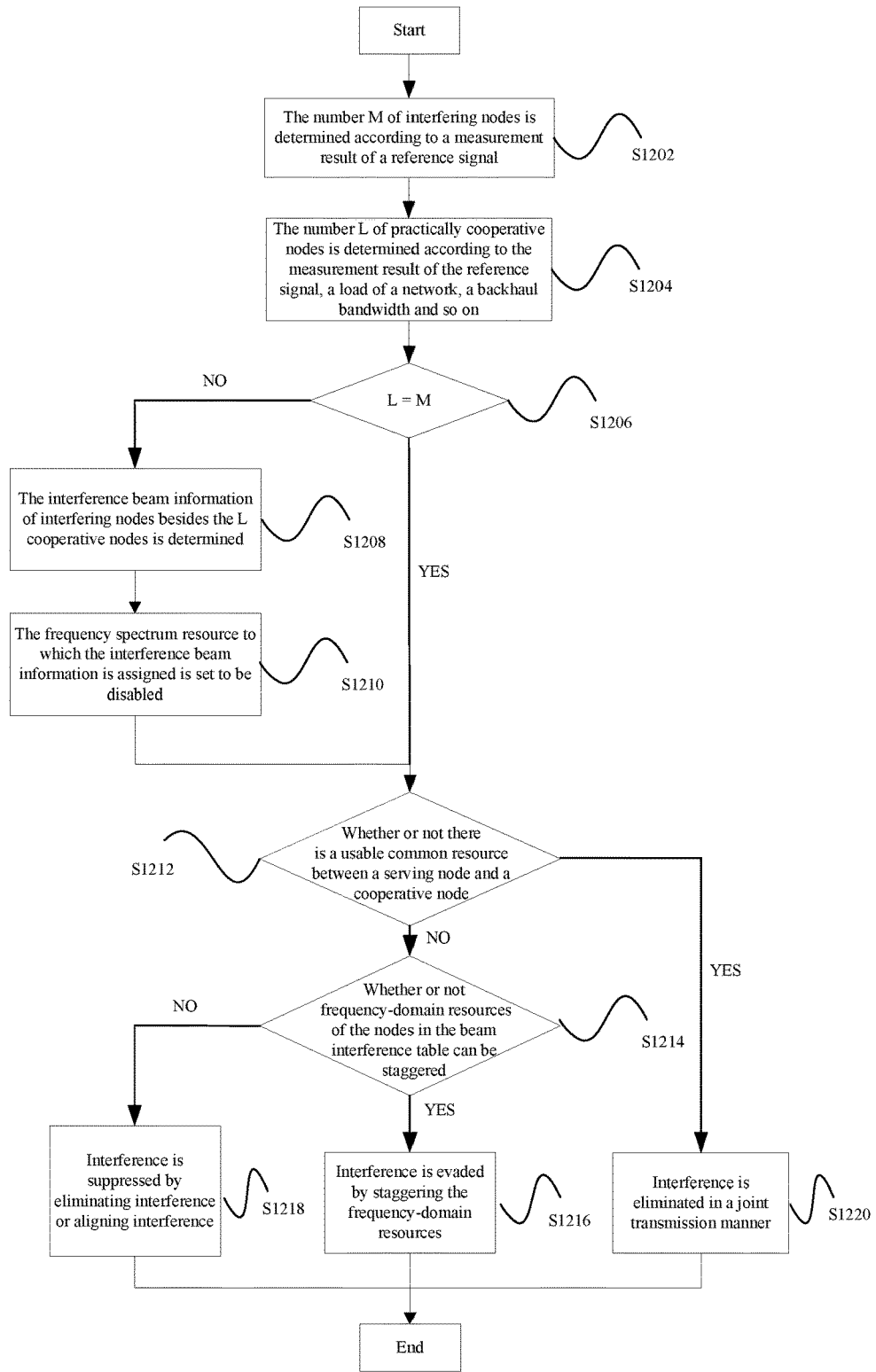
FIG. 12 is a flowchart showing an interference management strategy according to an example embodiment of the disclosure.

FIG. 12 is a flowchart showing an interference management strategy according to an example embodiment of the disclosure, and as shown in FIG. 12, the method includes the following steps:

S1202: the number M of interfering nodes is determined according to a measurement result of a reference signal;

S1204: the number L of practically cooperative nodes is determined according to the measurement result of the reference signal, a load of a network, a backhaul bandwidth and so on;

S1206: it is determined whether or not L is equal to M, when L is not equal to M, then S1208 is executed, otherwise, S1212 is executed;

S1208: the interference beam information of interfering nodes besides the L cooperative nodes is determined, and then S1210 is executed;

S1210: the frequency spectrum resource to which the interference beam information is assigned is set to be disabled, and then S1212 is executed;

S1212: it is determined whether or not there is a usable common resource between a serving node and a cooperative node, when there is a usable common resource between the serving node and the cooperative node, S1220 is executed, otherwise, S1214 is executed;

S1214: it is determined whether or not frequency-domain resources of the nodes in the beam interference table can be staggered, when the frequency-domain resources of the nodes in the beam interference table can be staggered, S1216 is executed, otherwise, S1218 is executed;

S1216: interference is evaded by staggering the frequency-domain resources;

S1218: interference is suppressed by eliminating interference or aligning interference; and S1220: interference is eliminated in a joint transmission manner.

Step 5: the centralized manager or equipment in a upper layer of the control-panel node distributes the interference management strategy information, for example, an interference management scheme, resource pre-allocation information or signal processing information, and the like, to a control-panel node, and the control-panel node executes the interference management strategy and determines, based on the interference strategy information, a corresponding resource assignment scheme or a signal processing scheme for each service according to channel status information;

It should be noted that the various combinations of the foregoing embodiments should all fall within the scope of protection of the disclosure.

According to example embodiments of the disclosure, the modeling is performed for the interference relationship of a space-domain beam direction, models for a plurality of dimensions including a time domain, a frequency domain and a space domain are integrated in interference management, and a proper interference management strategy is selected for different scenes, thereby realizing that the diversity and the dynamics of interference is adapted better; resources in a space-domain are utilized effectively; the resource utilization rate of a system is increased; inter-cell interference is suppressed effectively; the frequency spectrum efficiency of a network is enhanced.

Obviously, those skilled in the art should understand that all components or all steps in the embodiments of the disclosure can be realized by using a generic computation apparatus, can be centralized on a single computation apparatus or can be distributed on a network composed of a plurality of computation apparatuses. Optionally, they can be realized by using executable program codes of the computation apparatuses. Thus, they can be stored in a storage apparatus and executed by the computation apparatuses, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the principle of the disclosure shall fall within the protection scope of the disclosure.

INDUSTRIAL APPLICABILITY

Based on the technical solutions provided herein, spatial beam interference information between each of nodes and a surrounding node of each node is acquired; an interference management strategy for a service in each node is determined according to the spatial beam interference information and resource allocation information of the surrounding node of each node, wherein the resource allocation information is information for allocating resources of a service in the surrounding node of each node, and the resources are in a time domain, a frequency domain and a space domain; and the interference management strategy of the service in each node is executed; the problem that interference management schemes in the related art can only be used independently to manage interference in a time domain, frequency domain or space domain is solved, thereby adapting the diversity and the dynamics of interference more flexibly.

What is claimed is:

1. A method for processing cell interference, comprising:
acquiring spatial beam interference information between each of nodes and a surrounding node of each node;
determining an interference management strategy for a service in each node according to the spatial beam interference information and resource allocation information of the surrounding node of each node, wherein the resource allocation information is information for allocating resources of a service in the surrounding node of each node, and the resources are in a time domain, a frequency domain and a space domain; and
executing the interference management strategy of the service in each node, wherein acquiring the spatial beam interference information between each of the nodes and the surrounding node of each node comprises:
determining a beam direction in which signal quality is optimal between each node and UE; and determining the spatial beam interference information between each node and the surrounding node of each node according to a Reference Signal Receiving Power (RSRP) value or a Reference Signal Receiving Quality (RSRQ) value of each node in a corresponding beam direction, wherein determining the spatial beam interference information between each node and the surrounding node of the each node according to the RSRP value or the RSRQ value of each node in the corresponding beam direction comprises:
determining, when the difference between RSRP values or RSRQ values of any two nodes of the nodes is smaller than a first preset threshold value and the RSRP values or RSRQ values of the two nodes in corresponding beam directions are both greater than a second preset threshold value, that there is an interference relationship between the two nodes in the corresponding beam directions; and acquiring the spatial beam interference information between each node and the surrounding node of each node according to the interference relationship.

2. The method as claimed in claim 1, wherein after acquiring the spatial beam interference information between each of the nodes and the surrounding node of each node, the method further comprises:

establishing or updating a spatial beam interference table of each node according to the spatial beam interference information.

3. The method as claimed in claim 2, wherein relationships between the nodes comprise a centralized architecture and a distributed architecture; each of the nodes comprises a control-panel node or a centralized manager; and establishing or updating a beam interference table of each node according to spatial beam interference information between the nodes comprises:

in the centralized architecture, receiving, by a centralized manager, spatial beam interference information from each control-panel node in a region, and establishing or updating, by the centralized manager, an interference relationship table of each control-panel node in the region; and in the distributed architecture, receiving, by each control-panel node, spatial beam interference information from a surrounding node of each control-panel node, and establishing or updating, by each control-panel node, an interference relationship table corresponding to each control-panel node.

4. The method as claimed in claim 3, wherein determining the interference management strategy for the service in each node according to the resource allocation information of the surrounding node of each node and the beam interference table of each node comprises:

in the centralized architecture, determining, by the centralized manager, the interference management strategy for all services in the region in an order of priorities of the services, according to resource allocation conditions of the surrounding node of the centralized manager in the time domain, the frequency domain and the space domain, in combination with the interference relationship table; and in the distributed architecture, acquiring, by a control-panel node, resource allocation conditions of a surrounding node of the control-panel node in the time domain, the frequency domain and the space domain according to spatial beam interference of the surrounding node of the control-panel node, and determining, by the control-panel node, the interference management strategy according to the obtained resource allocation conditions in combination with the interference relationship table.

5. The method as claimed in claim 4, wherein the interference management strategy comprises at least one of the following: joint transmission, resource evasion, interference elimination and interference alignment.

6. The method as claimed in claim 5, wherein determining the interference management strategy for the service in each node according to the resource allocation information of the surrounding node of each node and the beam interference table of each node comprises:

determining a space-domain beam range of the interference management strategy according to a movement velocity of user equipment;

determining, in the space-domain beam range, an interfering node, excluding a cooperative node and a serving node, and a beam direction corresponding to the interfering node from the beam interference table, obtaining the resource allocation information of the interfering node in the corresponding beam direction and disabling a time-frequency resource and a space-domain resource, which are pre-allocated to the interfering node;

determining whether or not there is a common usable time-frequency resource and a common usable space-domain resource between the serving node and the cooperative node in a corresponding beam direction, when there is the common usable time-frequency resource and the common usable space-domain resource, conducting a cooperative sending operation in the joint transmission manner, when there is no the common usable time-frequency resource or common usable space-domain resource, determining whether or not a time-frequency resource and a space-domain resource of the serving node and the cooperative node are able to be evaded in a corresponding beam direction, when the time-frequency resource and the space-domain resource of the serving node and the cooperative node are able to be evaded in a corresponding beam direction, adopting a strategy of the resource evasion, when the time-frequency resource and the space-domain resource of the serving node and the cooperative node are not able to be evaded in a corresponding beam direction, adopting a strategy of the inference alignment or interference elimination; and determining a time-frequency resource and a space-domain resource that are pre-allocated to the serving node and the cooperative node according to the interference management strategy.

7. The method as claimed in claim 6, wherein the space-domain beam range of the interference management strategy is determined according to the following formula:

$$S=[BI_i-\lfloor V^*\alpha \rfloor, BI_i+\lfloor V^*\beta \rfloor],$$

in which $\alpha$ and $\beta$ are weighting factors, the symbol $\lfloor\ \rfloor$ represents a rounding operation, V represents the movement velocity of the UE, and $BI_i$ represents an optimal beam direction of a serving node obtained according to a reference signal or a training signal.

8. The method as claimed in claim 6, wherein the serving node and the cooperative node are determined in one of the following ways:

in the centralized architecture, determining, by the centralized manager, a serving node and a cooperative node of a specified service according to the beam interference table of each control-panel node in combination with a load of each control-panel node; and in the distributed architecture, receiving, by the control-panel node, spatial beam interference information from a surrounding node of the control-panel node, and determining, by the control-panel node, a serving node and a cooperative node of a specified service according to the received beam interference information in combination with a load of the control-panel node.

9. The method as claimed in claim 8, wherein determining the serving node and the cooperative node corresponding to the specified service comprises:

selecting, according to an RSRP value or RSRQ value of each node in an optimal beam direction, a node of which an RSRP value or RSRQ value is optimal as a candidate serving node, and determining a beam direction corresponding to the candidate serving node; and in the centralized architecture, determining, by the centralized manager, a serving node and a cooperative node meeting a requirement of Quality of Service (QoS) of a specified service according to information of the candidate serving node in combination with the load of each control-panel node and information of a backhaul network; or in the distributed architecture, determining, by the control-panel node, a serving node and a cooperative node meeting a requirement of QoS of a specified service according to information of the candidate serving node in combination with a load of a surrounding node of the control-panel node and the information of a backhaul network.

10. An apparatus for processing cell interference, comprising:

an acquisition component, configured to acquire spatial beam interference information between each node of nodes and a surrounding node of each node;

a determination component, configured to determine an interference management strategy for a service in each node according to spatial beam interference information in a spatial beam interference table and resource allocation information of the surrounding node of each node, wherein the resource allocation information is information for allocating resources of a service in the surrounding node of each node, and the resources are in a time domain, a frequency domain and a space domain; and an execution component, configured to execute the interference management strategy of the service in each node, wherein the acquisition component is configured to determine a beam direction in which signal quality is optimal between each node and UE; and determine the spatial beam interference information between each node and the surrounding node of each node according to a Reference Signal Receiving Power (RSRP) value or a Reference Signal Receiving Quality (RSRQ) value of each node in a corresponding beam direction, wherein the acquisition component is configured to determine, when the difference between RSRP values or RSRQ values of any two nodes of the nodes is smaller than a first preset threshold value and the RSRP values or RSRQ values of the two nodes in corresponding beam directions are both greater than a second preset threshold value, that there is an interference relationship between the two nodes in the corresponding beam directions; and acquire the spatial beam interference information between each node and the surrounding node of each node according to the interference relationship.

11. The apparatus as claimed in claim 10, wherein the apparatus is further configured to establish or update a spatial beam interference table of each node according to the spatial beam interference information.

* * * * *